United States Patent [19]
Akasaka et al.

[11] Patent Number: 5,140,654
[45] Date of Patent: Aug. 18, 1992

[54] OPTICAL WAVEGUIDE DEVICE FOR POLARIZATION ROTATION

[75] Inventors: Hideki Akasaka, Kamagaya; Hiroshi Ohki, Yokohama; Masaaki Doi, Kashiwa, all of Japan

[73] Assignee: Nikon Corporation, Tokyo, Japan

[21] Appl. No.: 656,491

[22] Filed: Feb. 19, 1991

[30] Foreign Application Priority Data

Feb. 20, 1990 [JP] Japan .................... 2-39237

[51] Int. Cl.⁵ .............................. G02B 6/10
[52] U.S. Cl. .......................... 385/8; 385/9; 385/14
[58] Field of Search ............ 350/96.11, 96.12, 96.13, 350/96.14; 385/8, 9, 14

[56] References Cited

U.S. PATENT DOCUMENTS

| | | | |
|---|---|---|---|
| 4,153,328 | 5/1979 | Wang | 350/96.13 X |
| 4,384,760 | 5/1983 | Alferness | 350/96.14 |
| 4,966,431 | 10/1990 | Heismann | 350/96.14 |

OTHER PUBLICATIONS

Rod C. Alferness, "Electrooptic Guided-Wave Device for General Polarization Transformations," IEEE Journal of Quantum Elecronics, vol. QE-17, No. 6, Jun. 1981, pp. 965-969.

Primary Examiner—Akm E. Ullah
Assistant Examiner—Stephen W. Barns
Attorney, Agent, or Firm—Shapiro and Shapiro

[57] ABSTRACT

An optical waveguide device for polarization rotation comprises a substrate, a waveguide path arranged on the substrate, a mode converting element arranged at an intermediate region of the waveguide path, and a polarization rotating element arranged at a location in the waveguide path between a place where light is incident and the mode converting element. The mode converting element includes a phase shifter for relatively shifting a phase between TE and TM components of light transmitted through the waveguide path, in response to an applied voltage, and also includes a mode converter for converting modes between the TE and TM components. The polarization rotating element rotates a polarization plane of the light transmitted through the waveguide path by $(90 + 180 \times n)$ degrees, where n is zero or an integer.

3 Claims, 1 Drawing Sheet

OPTICAL WAVEGUIDE DEVICE FOR POLARIZATION ROTATION

BACKGROUND OF THE INVENTION

1. Field of the Invention

The present invention relates to an optoelectronic integrated circuit. Particularly, the present invention relates to an optical waveguide device having functions to perform polarization rotation.

2. Related Background Art

There is known an optical waveguide device having a function to output the inputted light by rotating its polarization plane, referring to one of the opto-electronic integrated circuits (OEIC), disclosed, for example, in Rod. C. Alferness, "Electrooptic Guided-Wave Device for General Polarization Transformations", IEEE Journal of Quantum Elextronics, Vol. QE-17, No. 6, June 1981, pp. 965-969.

For this known optical waveguide device, a mode converting element of phase compensation type is configured by providing a phase shifter and a mode converter along a waveguide formed on its substrate. The phase shifter has a function to shift phases relatively between TE and TM components (being at a right angle to each other) of incident light, while the mode converter has a function to perform the mode conversion of the TE and TM components. In order to rotate the polarization plane with this phase compensation type mode converting element, it is required to provide the TE and TM components with a phase difference of 90° at the inlet of the mode converter. Hence, the above-mentioned phase shifter is arranged before the mode converter to make the adjustment of the phase difference possible.

However, in a conventional optical waveguide device such as this, there has been a problem encountered that although the device functions effectively for light of a single wavelength, a desired rotation of the polarization plane is not obtainable when the wavelength spectra vary. In particular, while passing through the waveguide path, the TE and TM components produce a phase shift, but the amplitude of this phase shift varies for each wavelength. Accordingly, the phase difference at the inlet of the mode converter changes with the wavelength. As a result, a wavelength dispersion is generated for the rotation of polarization plane of the output light, making it impossible to obtain a desired rotation of the polarization plane at any wavelengths other than a specific wavelength.

For example, therefore, when the wavelength spectra range of light is broad in passing through the waveguide path as in the case of a superimposition of RF (radio frequency) on a laser diode of a light source for the reproducing head of magneto-optical recording, it is impossible to employ the conventional optical waveguide device.

SUMMARY OF THE INVENTION

An object of the present invention is to provide an optical waveguide device capable of obtaining a desired rotation of the polarization plane irrespective of the wavelength spectra of light.

An optical waveguide device according to the present invention comprises a waveguide path formed on a substrate, a mode converting element of a phase compensation type arranged at the intermediate region in the waveguide path, and polarization rotating means, arranged in the waveguide path between the input of the waveguide path and the mode converting element, for rotating the polarization plane by $(90 + 180 \times n)$ degrees, where n is zero or an integer. The waveguide path includes a first waveguide path portion provided between the input and the polarization rotating means and a second waveguide path portion between the polarization rotating means and the mode converting element. The lengths of the first and second waveguide path portions are established in such a manner that while light is passing through the waveguide path, variation of the initial phase difference between the TE and TM components generated along the waveguide path portions is cancelled.

In a desirable embodiment according to the present invention, the lengths of the first and second waveguide path portions are established almost identical, thus making it possible to obtain an optical waveguide device capable of attaining the above-mentioned object for any wavelength spectra.

In an optical waveguide device according to the present invention, the incident light generates a phase shift between TE and TM components as it proceeds in the waveguide path. The polarization rotating means allows the polarization plane of the incident light to be rotated to convert the modes of the TE and TM components. Thus, the direction of the phase shift of TE/TM hitherto taking place is inversed. The light emitted from the polarization rotating means again generates the phase shift between the TE and TM components while passing through the waveguide path to the mode converting element. Consequently, the phase shifted in the inversed direction returns to the state at the time of the initial incidence in the waveguide path.

Therefore, in an optical waveguide device according to the present invention, if the incident light is without any phase difference (irrespective of its wavelength) between the TE and TM components, the light reaching the mode converting element becomes light without any phase difference.

In an embodiment of the present invention, the polarization rotating means employs a phase compensation type mode converting element.

DETAILED DESCRIPTION OF THE PREFERRED EMBODIMENTS

Figure 1:
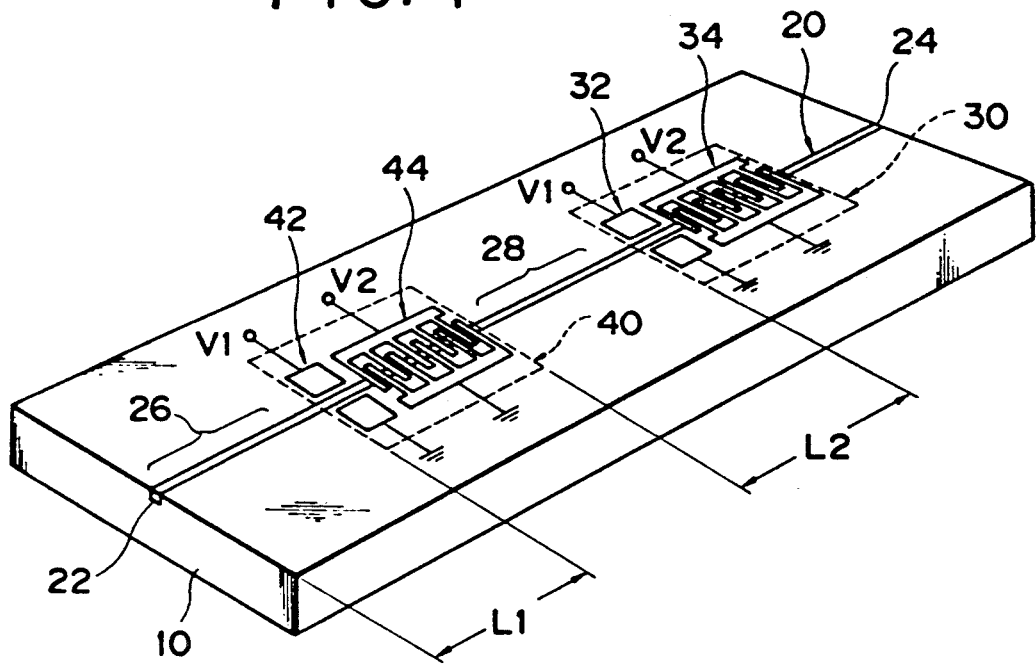
FIG. 1 is a perspective view showing an optical waveguide device according to an embodiment of the present invention.

In FIG. 1, illustrating an optical waveguide device according to an embodiment of the present invention, substrate 10 comprises a Y cut X propagating crystal or an X cut Y propagating crystal. Waveguide path 20 is arranged continuously from one end 22 of substrate 10 to another end 24 thereof, and at an intermediate region therein, mode converting element 30 of phase compensation type is arranged.

Figure 2:
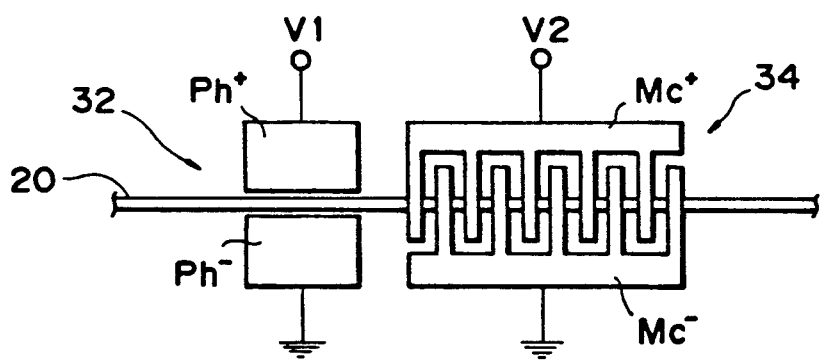
FIG. 2 is an enlarged view showing the structure of the mode converting element shown in FIG. 1.

As shown in FIG. 2, mode converting element 30 comprises phase shifter 32 and mode converter 34.

Phase shifter 32 comprises a pair of electrodes ph+ and ph−, and a voltage $V_1$ is applied across both electrodes. The voltage $V_1$ of phase shifter 32 is adjusted to provide a phase difference of 90° between the TE and TM components of light when the phase difference of the light transmitted in the direction from the left to the right in the waveguide path 20 shown in FIG. 2 is converted electro-optically.

Mode converter 34 comprises a pair of cyclic electrodes, Mc+ and Mc−, and a voltage $V_2$ is applied across both electrodes. Mode converter 34 performs mode conversion, in response to the applied voltage $V_2$, between the TE and TM components which have been adjusted by phase shifter 32 to have an optimized phase difference. Therefore, the TE component at the time of incidence is converted into the TM component when it leaves mode converter 34.

In this respect, a detailed description of this mode converting element 30 is disclosed in the aforesaid Rod C Alferness, "Electrooptic Guided-Wave Device for General Polarization Transformations".

Mode converting element 40 is arranged in an intermediate location between one end 22 of waveguide path 20 and mode converting element 30. Mode converting element 40 constitutes polarization rotating means according to the present invention and includes phase shifter 42 and mode converter 44. In other words, in the present embodiment, mode converting element 30 and mode converting element 40 are formed in the same structure. However, since polarization rotating means according to the present invention is such that only a function is provided therewith to convert modes between the TE and TM components, it may also be possible to form mode converting element 40 only by mode converter 44 with the omission of phase shifter 42.

Now, given the length of optical path of the first waveguide path portion 26 from one end of waveguide path 20 to mode converting element 40 as $L_1$, and the length of optical path of the second waveguide path portion 28 from mode converting element 40 to mode converting element 30 as $L_2$, the position of mode converting element 40 is determined to make the relationship of these lengths to be $L_1 = L_2$.

In a case where light of wavelength $\lambda$ without any phase difference between the TE and TM components is inputted into waveguide path 20 from the end 22, there occurs a phase difference $\delta$ between the TE and TM components of this light while it is being transmitted through the first waveguide path portion 26. Then, the mode conversion of TE/TM components is performed by rotating the polarization plane by $(90 + 180 \times n)$ degrees (where n is zero or an integer) in mode converting element 40. Thus, assuming that the phase difference between TE and TM components is, for example, $+\delta$ at the time of input to mode converting element 40, the phase difference between the TE and TM components becomes $-\delta$ at the time of output from mode converting element 40.

Since the second waveguide path portion 28 is established to be in the same length as the first waveguide path portion 26 so that the phase difference $+\delta$ is generated between the TE and TM components of the above-mentioned light, the phase difference $-\delta$ output from mode converting element 40 is offset while being transmitted through the second waveguide path portion 28. Hence, the light of wavelength $\lambda$ at the input of mode converting element 30 is in the same state as at the time of input to the end 22, i.e., the state where no phase difference is present between the TE and TM components.

As the above describes, the phase shifts generated between the TE and TM components in the first and second waveguide path portions maintain a relationship in which the positive and the negative are just opposite, and these are offset irrespective of the wavelength of light being transmitted through the waveguide path. Consequently, it becomes possible to obtain a desired polarization rotation in response to the control of an applied voltage in mode converting element 30 even when the wavelength the light source is varied or widened.

What is claimed is:

1. An optical waveguide device comprising:
   a substrate;
   a waveguide path arranged on said substrate;
   a mode converting element arranged at an intermediate region of said waveguide path, said mode converting element including a phase shifter for relatively shifting a phase between TE and TM components of light being transmitted through said waveguide path, in response to an applied voltage, and a mode converter for converting modes between said TE and TM components; and
   means for polarization rotation, arranged at a location in the waveguide path between an input where light enters said waveguide path and said mode converting element, for rotating the polarization plane of the light transmitted through said waveguide path by $90 + 180 \times n$ degrees (where n is zero or an integer);
   wherein said waveguide path includes a first waveguide path portion between said input and said means for polarization rotation, and a second waveguide path portion between said means for polarization rotation and said mode converting element, and the lengths of said first and second waveguide path portions are determined to cancel any variation of an initial phase difference between TE and TM components generated along said waveguide path portions.

2. An optical waveguide device according to claim 1, wherein the lengths of said first and second waveguide path portions are substantially the same.

3. An optical waveguide device according to claim 1, wherein said means for polarization rotation includes a mode converter for converting modes between said TE and TM components.

* * * * *